Feb. 27, 1934.  H. A. F. VON RECHENBERG  1,948,998

ROTARY SEPARATOR

Filed Nov. 4, 1931

Inventor:
Hans Albrecht Freiherr von Rechenberg.
Attorney:

Patented Feb. 27, 1934

1,948,998

UNITED STATES PATENT OFFICE 1,948,998

ROTARY SEPARATOR

Hans Albrecht Freiherr von Rechenberg, Cologne, Germany

Application November 4, 1931, Serial No. 572,988
In Germany November 4, 1930

2 Claims. (Cl. 209—95)

My invention relates to a process for separating grain by a rotary separator, such as employed for separating wheat and like grains from oats, wheat seeds or the like, and has for its objects to increase the efficiency and the output of the same. Separators for grains, seed and the like are known which are comprised of a drum rotating at a very high speed, pockets provided on the inner periphery of the drum, a receiving hopper positioned within the drum, and means deeply extending into the kidney-shaped body of grain forming itself in the drum during operation, said means serving to prevent the knidney-shaped body of grain or seed from moving up and down. In separators of this kind, the means extending into the body of grain promote the formation of layers in said body, which formation decreases the efficiency of the separating operation, because the layers in the interior of the body do not sufficiently contact with the peripheral face of the drum and, for this reason, are not properly subjected to the separating effect.

My experiments have shown that, in order to obtain an efficient separating operation in the drum provided with pockets, it is important to interfere with the formation of the kidney-shaped mass of material.

According to my invention, I prevent the mass of material to be treated from forming a kidney-shaped body by feeding the interior layers of the body of grain through suitable means in a direction opposite to the rotation of the drum into the portion of the drum situated in front of the body, viewed in the direction of rotation. Said means may comprise a rotary agitator revolving in a direction opposite to that of the drum, or an inclined surface combined with a distributing roller, or compressed air, or the like. The effective surface of the drum contacting with the grains and the efficiency of the separator is thereby increased.

Figure 2:
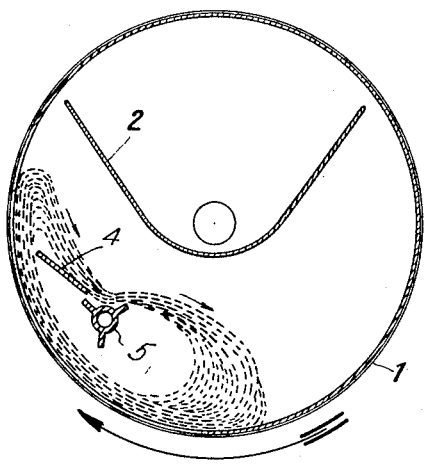
Fig. 2 is a view similar to that shown in Fig. 1, but illustrating a modification of the invention.
Figure 1:
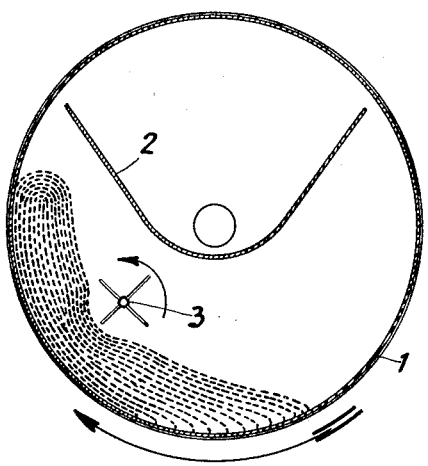
Fig. 1 is a diagrammatic cross section through my rotary separator.

My invention is diagrammatically shown in Fig. 2. The drum 1 suitably mounted for rotation in direction of the arrow, is equipped with a plurality of pockets (not shown) provided on its inner face so as to carry the grains upwards and into a hopper or receiver 2.

For the purpose of my invention, I may provide below the hopper 2 a rotary shaft 3 extending parallel to the axis of the drum and carrying a plurality of radial agitating blades. The shaft 3 revolves in a direction opposite to that of the drum and is so positioned that its radial blades engage the upper downwardly moving layers of the kidney-shaped mass to be treated, thereby throwing the grains contained in said layers opposite to the direction of rotation of the drum and in front of the mass, when viewed in the direction of rotation. Thus, the agitator moves the grains onto a portion of the inner peripheral surface of the drum which, in prior constructions, was free from grains.

A separator constructed and operated in accordance with my invention will separate a much larger quantity than the separator of the prior art.

In the embodiment shown in Fig. 2, I have arranged an inclined board 4 within the drum 1. This is sufficiently spaced from the inner drum surface to permit the free passage of the upwardly moving layers of grain, but it is located to intercept the cascade of grain as indicated in Fig. 2. The board conducts the grain towards a distributing roller 5 equipped with suitable blades and adapted to throw the grain to a point beyond the lowermost portion of the drum as indicated in the drawing.

Figure 3:
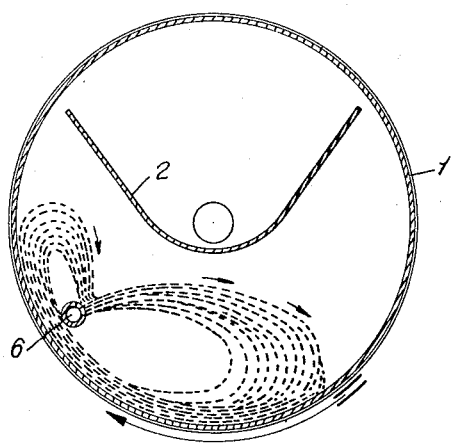
Fig. 3 is a similar view showing a still further modification.

In Fig. 3 there is shown a modified arrangement in which a pipe 6 supplied with air under pressure is arranged parallel to the axes of the drum at a distance from the periphery thereof which is sufficient to permit a free passage of the rising layers of grain. The grain cascading downward as indicated in Fig. 3 is carried towards the right by a blast of air issuing from suitable orifices provided in pipe 6, and it is thus conveyed to a point beyond the lowermost portion of the drum surface.

What I claim is:—

1. In the process for separating grain from weed seeds which comprises supporting a certain mass of grain on the inside of a cylindrical surface having cavities for receiving the seeds, rotating said cylindrical surface about its axis at a speed sufficient to cause the lower layers of the mass of grain to be carried upwards on the rising zone of said surface to a point from which they will cascade downwardly over said lower layers, the step of positively engaging and throwing grain particles carried downward within said cascade to a point beyond the lowermost portion of said surface without interfering with the upward movement of said layers.

2. In the process for separating grain from weed seeds which comprises supporting a certain mass of grain on the inside of a cylindrical surface having cavities for receiving the seeds, rotating said cylindrical surface about its axis at a speed sufficient to cause the lower layers of the mass of grain to be carried upwards on the rising zone of said surface to a point from which they will cascade downwardly over said lower layers, the step of agitating and throwing grain particles carried downward within said cascade to a point beyond the lowermost portion of said surface, the upward motion of said layers being unhampered.

HANS ALBRECHT FREIHERR
VON RECHENBERG.